United States Patent Office 2,984,881
Patented May 23, 1961

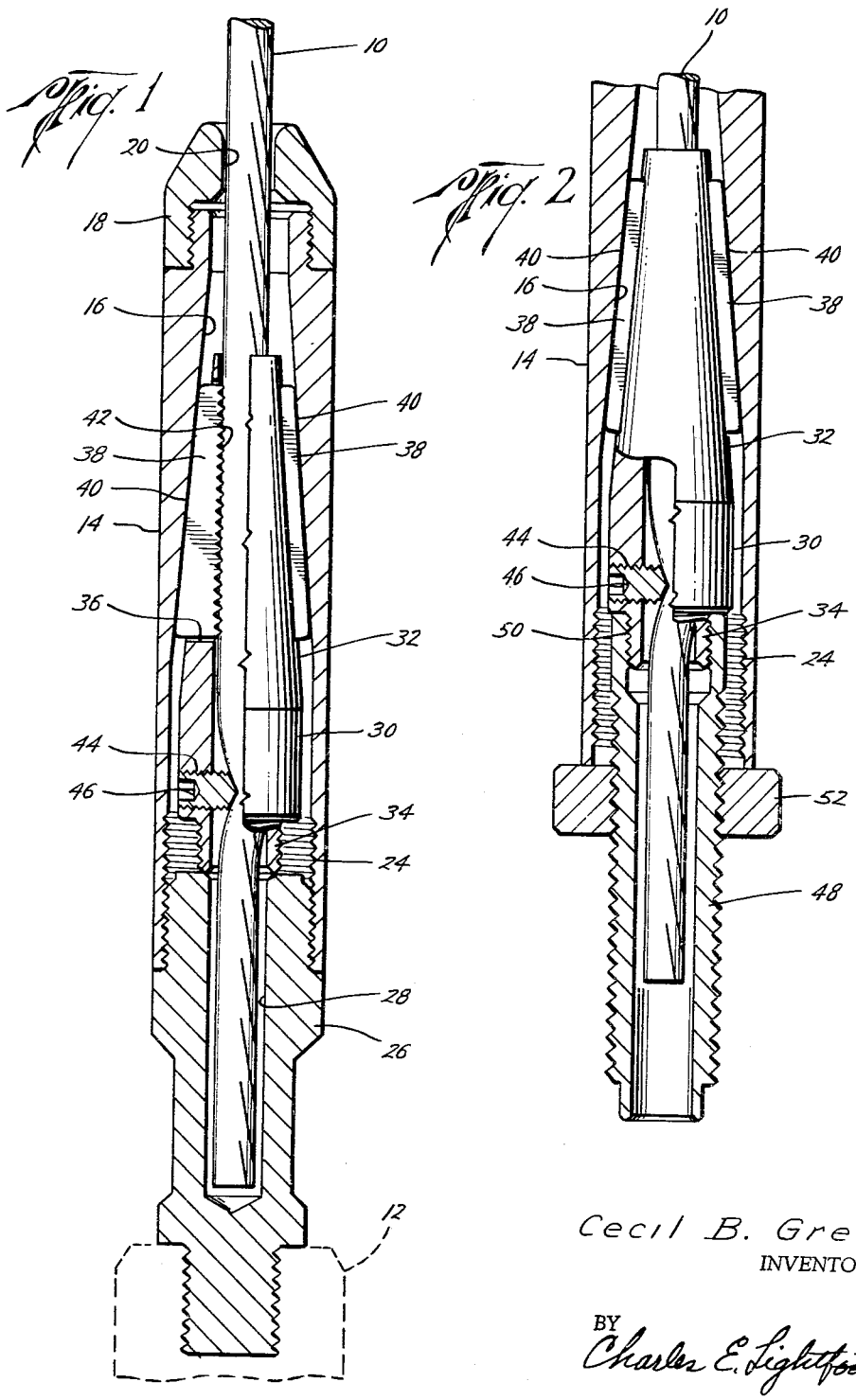

2,984,881
CABLE ANCHORING DEVICE
Cecil B. Greer, 5142 Jason St., Houston, Tex.
Filed Dec. 4, 1957, Ser. No. 700,580
3 Claims. (Cl. 24—125)

This invention relates to a cable anchoring device or wire rope socket, and more particularly to a device, which may be clamped to a cable for attaching the cable to a support or to an object to be supported thereby and including means whereby the cable may be readily released from the device when desired.

The invention finds particular application in connection with cable equipment, such as that used in carrying out well drilling and production operations, and which is often employed at locations where machine shop or repair apparatus is not available and where changes or repairs must be made on location with the simplest tools and with a minimum of delay.

In the attaching of wire rope or cable to rope sockets as heretofore commonly constructed it has been customary to melt a suitable quantity of metal, such as babbit, which is poured into an internally tapered socket, in which the end of the rope has been inserted with the strands of the rope suitably separated and positioned, so that the metal forms a core in the socket anchoring the rope end in place therein. This method of attaching a rope socket not only requires the use of equipment for melting and handling the molten babbit, but it is also frequently necessary to provide suitable packing about the rope at the lower end of the socket to prevent loss of molten metal during the pouring operation. Moreover, in the pouring of molten metal there is always the danger of spattering, and in the presence of moisture in the socket the heated metal may be blown out by the formation of steam, or cavities in the metal may be formed thereby, which prevent the secure anchoring of the rope in the socket.

The present invention has for an important object the provision of a cable anchoring device which is easily applied to the end portion of a cable without separating the strands of the cable and without the use of molten metal.

Another object of the invention is to provide a cable anchoring device having an internally tapered, tubular socket and cable gripping means which is engageable with the tapered internal surface of the socket and with the cable to grippingly engage the cable to securely anchor the cable in the socket.

A further object of the invention is the provision of a cable socket and a slip carrier and cable gripping slips movably carried thereby which are shaped for coaction with the socket to move the slips into gripping engagement with the cable to anchor the cable in the socket and which may be readily actuated to release the cable.

Another object of the invention is to provide a cable anchoring device including a tubular socket member having an internal tapering surface, a tubular slip carrier movably positioned in the socket member for longitudinal movement therein and having window openings located opposite said tapering surface and cable gripping slips movably carried by the carrier in the window openings and having faces positioned for engagement with said tapering surface to move the slips into gripping engagement with a cable extending through the carrier upon movement of the carrier in one direction in the socket and to be moved out of engagement with the tapering surface upon movement of the carrier in the other direction to permit the slips to move out of gripping engagement with the cable.

A further object of the invention is the provision of cable anchoring mechanism of the character mentioned including means for releasably connecting the carrier to the cable to cause the carrier to move with the cable in a direction to engage the slips with the internal tapering surface of the socket to cause the slips to grippingly engage the cable.

Another object of the invention is to provide cable anchoring mechanism of the type referred to including means for moving the slip carrier in the socket in a direction to disengage the slips from the internal tapering surface of the socket to permit the slips to be disengaged from the cable to release the cable.

A still further object of the invention is the provision of a cable anchoring device which is of simple design and rugged construction and wherein the cable gripping mechanism is easily operated to attach the cable to the device or release the same therefrom.

The above and other important objects and advantages of the invention may best be understood from the following detailed description, constituting a specification of the same when considered in conjunction with the annexed drawings, wherein—

Figure 1 is a vertical, central, cross-sectional view of a preferred embodiment of the invention, showing the anchoring device with the cable attached thereto; and Figure 2 is a fragmentary view, similar to that of Figure 1, showing the cable releasing device of the invention and the manner in which it is used to release the cable gripping slips to permit the cable to be released from the device.

Referring now to the drawings in greater detail the invention is illustrated in connection with a cable or wire rope 10, such as is ordinarily employed in the operation of well equipment of usual type, generally indicated at 12 in Figure 1, and which is connected to the cable for the lowering and raising of the equipment in a well bore.

The cable anchoring device of the invention comprises a tubular body or barrel 14 having an internal, tapering bore portion 16 and an externally reduced, externally threaded upper end portion 18 for the attachment thereto of a cap 20 having an opening 22 through which the cable 10 extends. The barrel 14 is internally threaded at its lower end portion, as indicated at 24 for the attachment thereto of the externally threaded upper end of a sub or connector member 26, whose lower end is externally threaded for connection to the equipment 12 to be suspended.

The sub 26 may be provided with a central bore 28 whose upper end opens into the interior of the barrel, so that the cable 10 may be extended through the barrel and into the sub.

Within the barrel 14 a tubular slip carrier 30 is positioned for longitudinal movement, which carrier has a tapered external surface 32 corresponding generally to the taper of the internal tapering surface 16 of the barrel and which is formed with an externally reduced, externally threaded lower end portion 34 for a purpose to be hereinafter explained. The carrier 30 is provided with lateral window openings 36, one of which may best be seen in Figure 1, which open into the bore of the carrier and to the exterior of the carrier and within which slips 38 are movably disposed for radial movement.

The slips 38 have other longitudinal faces 40 which are shaped to correspond to the taper of the surface 16 of the barrel and coact therewith upon upward movement of the slip carrier in the barrel to move the slips inwardly into gripping engagement with the cable 10, and the slips are provided on their inner faces with teeth 42 positioned to grippingly engage the cable. The slip carrier has an internally threaded opening 44 for the reception of a set screw 46 which may be extended into the bore of the carrier into engagement with the cable to connect the carrier to the cable for movement therewith.

In assembling the anchoring device and attaching the same to the cable 10, the cable is extended through the cap 18 and barrel 14 with the sub 26 and carrier and its slips removed therefrom, and the cable is then passed through the carrier and secured thereto by the set screw 46. The carrier and its slips are then pulled into the barrel by the cable until the slips engage the tapering surface 16 and are moved into gripping engagement with the cable, after which the sub 26 is connected to the barrel with the end of the cable extending into the bore 28 of the sub. When the sub is connected to the line suspended equipment and a pull is exerted on the cable, the carrier will be moved longitudinally upwardly in the barrel to cause the slips to wedgingly engage the barrel and cable.

It will be noted that the slips 38 extend outwardly radially beyond the carrier a sufficient distance to permit the slips to be moved into tight gripping engagement with the cable 10 while the carrier is still out of contact with the tapering surface 16 of the barrel, so that the slips will be more tightly engaged with the cable upon the exertion of a greater pull on the cable, whereby slipping of the cable in the anchoring device is prevented.

To release the cable from the anchoring device, the carrier is moved downwardly in the barrel to release the slips 38 and this may be accomplished by the use of the extractor tool illustrated in Figure 2. The extractor tool comprises a tubular member 48 which is externally threaded throughout a large part of its length and whose inner end is internally threaded as shown at 50 for connection to the externally threaded lower end portion 34 of the carrier.

The extractor tool is of substantially smaller external diameter than the internal diameter of the lower end portion of the barrel 14 so that the tool may be readily inserted into the barrel after the sub 26 has been removed to threadably engage the tool with the lower end of the carrier.

A nut 52 is threaded upon the tool 48 for engagement with the lower end of the barrel which nut is larger than the external diameter of the barrel. Upon tightening of the nut 52 in engagement with the lower end of the barrel and with the tool threadably connected to the carrier, the carrier will be moved downwardly in the barrel to release the slips 38, whereupon the carrier may be lowered out of the barrel and the set screw 46 loosened to permit the cable to be withdrawn.

The invention, constructed and arranged as described above provides a cable anchoring device of strong construction, which is easily assembled and disassembled and whose gripping force increases with the pulling force exerted on the cable thus preventing slipping of the cable in the anchor.

While the invention is disclosed herein in connection with a certain specific embodiment of the same, this is intended by way of illustration only, and various changes can be made in the construction and arrangement of the parts within the spirit of the invention and the scope of the appended claims.

Having thus clearly shown and described the invention, what is claimed as new and desired to secure by Letters Patent is:

1. In a rope socket a tubular barrel into which a rope may be extended, a slip carrier disposed in the barrel for longitudinal movement therein, slips mounted on the carrier for longitudinal movement therewith and for radial movement relative to the carrier toward and away from the rope, means in the barrel positioned for engagement with the slips to move the slips radially into gripping engagement with the rope upon movement of the carrier in one direction in the barrel, means for moving said carrier in the other direction to move the slips to positions to permit the slips to move out of gripping engagement with the rope and means for anchoring the carrier to the rope independently of the slips to cause the carrier to move with the rope in the barrel.

2. In a rope socket a tubular barrel into which a rope may be extended, a slip carrier disposed in the barrel for longitudinal movement therein, slips mounted on the carrier for longitudinal movement therewith and for radial movement relative to the carrier toward and away from the rope, means in the barrel positioned for engagement with the slips to move the slips radially into gripping engagement with the rope upon movement of the carrier in one direction and for disengagement from the slips upon movement of the carrier in the other direction to permit the slips to move out of gripping engagement with the rope, and means for anchoring the carrier to the cable independently of the slips to cause the carrier to move with the cable relative to the barrel and means for moving the carrier in the other direction.

3. In a rope socket a tubular barrel into which a rope may be extended, a slip carrier disposed in the barrel for longitudinal movement therein, slips mounted on the carrier for longitudinal movement therewith and for radial movement relative to the carrier toward and away from the rope, means in the barrel positioned for engagement with the slips to move the slips radially into gripping engagement with the rope upon movement of the carrier in one direction and for disengagement from the slips to permit the slips to move out of gripping engagement with the rope upon movement of the carrier in the other direction, means for anchoring the carrier to the cable independently of the slips to cause the carrier to move with the cable relative to the barrel said carrier having an externally threaded end portion and means threadably engageable with said end portion and positioned for coaction with the barrel to move the carrier in said other direction.

References Cited in the file of this patent

UNITED STATES PATENTS

| | | |
|---|---|---|
| 890,091 | Parmeter | June 9, 1908 |
| 1,910,121 | Muntz | May 23, 1933 |
| 2,209,620 | Berndt | July 30, 1940 |
| 2,266,883 | Lukes | Dec. 23, 1941 |
| 2,288,138 | Jugle | June 30, 1942 |